(12) United States Patent
Cox et al.

(10) Patent No.: US 8,306,772 B2
(45) Date of Patent: Nov. 6, 2012

(54) METHOD FOR ESTIMATING TEMPERATURE AT A CRITICAL POINT

(75) Inventors: Keith Cox, Campbell, CA (US); Gaurav Kapoor, Santa Clara, CA (US); Vaughn Arnold, Scotts Valley, CA (US)

(73) Assignee: Apple Inc., Cupertino, CA (US)

( * ) Notice: Subject to any disclaimer, the term of this patent is extended or adjusted under 35 U.S.C. 154(b) by 820 days.

(21) Appl. No.: 12/250,498

(22) Filed: Oct. 13, 2008

(65) Prior Publication Data

US 2010/0094582 A1    Apr. 15, 2010

(51) Int. Cl.
*G01K 1/00* (2006.01)
(52) U.S. Cl. .......................................... 702/132
(58) Field of Classification Search .................. 702/132
See application file for complete search history.

(56) References Cited

U.S. PATENT DOCUMENTS

| | | |
|---|---|---|
| 3,730,985 A | 5/1973 | Whitney |
| 4,445,636 A | 5/1984 | Peters |
| 4,465,077 A | 8/1984 | Schneider |
| 4,845,647 A | 7/1989 | Dils et al. |
| 5,167,024 A | 11/1992 | Smith et al. |
| 5,520,153 A | 5/1996 | Milunas |
| 5,532,935 A | 7/1996 | Ninomiya et al. |
| 5,627,412 A | 5/1997 | Beard |
| 5,739,670 A | 4/1998 | Brost et al. |
| 5,812,860 A | 9/1998 | Horden |
| 5,814,973 A | 9/1998 | Liu |
| 5,825,674 A | 10/1998 | Jackson |
| 5,842,027 A | 11/1998 | Oprescu et al. |
| 5,915,838 A | 6/1999 | Stals et al. |
| 5,963,424 A | 10/1999 | Hileman et al. |
| 5,964,879 A | 10/1999 | Dunstan et al. |
| 6,122,758 A | 9/2000 | Johnson et al. |
| 6,134,667 A | 10/2000 | Suzuki et al. |
| 6,191,546 B1 | 2/2001 | Bausch et al. |
| 6,270,252 B1 | 8/2001 | Siefert |
| 6,349,269 B1 | 2/2002 | Wallace, Jr. |

(Continued)

FOREIGN PATENT DOCUMENTS

DE    102006002904    8/2007

(Continued)

OTHER PUBLICATIONS

PCT Invitation to Pay/Partial International Search (dated Feb. 7, 2009), International Application No. PCT/US2009/041036, International Filing Date—Apr. 17, 2009, 4 pages.

(Continued)

*Primary Examiner* — Cindy H Khuu
(74) *Attorney, Agent, or Firm* — Blakely, Sokoloff, Taylor & Zafman LLP

(57) ABSTRACT

Methods and apparatuses are disclosed to estimate temperature at one or more critical points in a data processing system comprising modeling a steady state temperature portion of a thermal model at the one or more critical points using regression analysis; modeling the transient temperature portion of the thermal model at the one or more critical points using a filtering algorithm; and generating a thermal model at the one or more critical points by combining the steady state temperature portion of the thermal model with the transient temperature portion of the thermal model. The thermal model may then be used to estimate an instantaneous temperature at the one or more critical points or to predict a future temperature at the one or more critical points.

16 Claims, 11 Drawing Sheets

U.S. PATENT DOCUMENTS

| | | |
|---|---|---|
| 6,415,388 B1 | 7/2002 | Browning et al. |
| 6,477,156 B1 | 11/2002 | Ala-Laurila et al. |
| 6,507,282 B1 | 1/2003 | Sherwood |
| 6,594,771 B1 | 7/2003 | Koerber et al. |
| 6,718,474 B1 | 4/2004 | Somers et al. |
| 6,745,117 B1 | 6/2004 | Thacher et al. |
| 6,888,332 B2 | 5/2005 | Matsushita |
| 6,925,573 B2 | 8/2005 | Bodas |
| 6,952,782 B2 | 10/2005 | Staiger |
| 6,986,069 B2 | 1/2006 | Oehler et al. |
| 7,019,638 B1 | 3/2006 | Wallace |
| 7,036,027 B2 | 4/2006 | Kim et al. |
| 7,111,178 B2 | 9/2006 | Rusu et al. |
| 7,134,029 B2 | 11/2006 | Hepner et al. |
| 7,139,920 B2 | 11/2006 | Williams |
| 7,162,651 B2 | 1/2007 | Brockhaus |
| 7,171,570 B2 | 1/2007 | Cox et al. |
| 7,177,728 B2 | 2/2007 | Gardner |
| 7,178,043 B2 | 2/2007 | Nakazato |
| 7,194,646 B1 | 3/2007 | Watts, Jr. |
| 7,221,862 B1 | 5/2007 | Miller et al. |
| 7,228,448 B2 | 6/2007 | Anderson et al. |
| 7,272,732 B2 | 9/2007 | Farkas et al. |
| 7,295,949 B2 | 11/2007 | Vorenkamp et al. |
| 7,353,133 B2 | 4/2008 | Park |
| 7,421,598 B2 | 9/2008 | Brittain et al. |
| 7,451,332 B2 | 11/2008 | Culbert et al. |
| 7,529,948 B2 | 5/2009 | Conroy et al. |
| 7,562,234 B2 | 7/2009 | Conroy et al. |
| 7,574,321 B2 | 8/2009 | Kernahan et al. |
| 7,640,760 B2 | 1/2010 | Bash et al. |
| 7,788,516 B2 | 8/2010 | Conroy et al. |
| 7,802,120 B2 | 9/2010 | Conroy et al. |
| 7,949,888 B2 | 5/2011 | Cox et al. |
| 7,949,889 B2 | 5/2011 | Sotomayor, Jr. et al. |
| 2001/0021217 A1 | 9/2001 | Gunther et al. |
| 2002/0007463 A1 | 1/2002 | Fung |
| 2002/0020755 A1 | 2/2002 | Matsushita |
| 2002/0065049 A1 | 5/2002 | Chauvel et al. |
| 2002/0083354 A1 | 6/2002 | Adachi |
| 2002/0099962 A1 | 7/2002 | Nakamura |
| 2002/0130788 A1 | 9/2002 | Chang |
| 2002/0143488 A1 | 10/2002 | Cooper et al. |
| 2002/0149911 A1 | 10/2002 | Bishop et al. |
| 2002/0194509 A1 | 12/2002 | Plante et al. |
| 2003/0053293 A1 | 3/2003 | Beitelmal et al. |
| 2003/0076065 A1* | 4/2003 | Shafer et al. ............... 318/567 |
| 2003/0126475 A1 | 7/2003 | Bodas |
| 2003/0179040 A1 | 9/2003 | Kossor |
| 2003/0188210 A1 | 10/2003 | Nakazato |
| 2004/0003301 A1 | 1/2004 | Nguyen |
| 2004/0003303 A1 | 1/2004 | Oehler et al. |
| 2004/0044914 A1 | 3/2004 | Gedeon |
| 2004/0064745 A1 | 4/2004 | Kadambi |
| 2004/0088590 A1 | 5/2004 | Lee et al. |
| 2004/0117680 A1 | 6/2004 | Naffziger |
| 2004/0131104 A1* | 7/2004 | Seferian .................. 374/178 |
| 2004/0133816 A1 | 7/2004 | Miyairi |
| 2004/0148258 A1 | 7/2004 | Silvester |
| 2004/0148528 A1 | 7/2004 | Silvester |
| 2004/0159240 A1 | 8/2004 | Lyall |
| 2004/0163001 A1 | 8/2004 | Bodas |
| 2004/0181698 A1 | 9/2004 | Williams |
| 2004/0210787 A1 | 10/2004 | Cox et al. |
| 2005/0015764 A1 | 1/2005 | Gaur |
| 2005/0041000 A1 | 2/2005 | Plut |
| 2005/0049729 A1 | 3/2005 | Culbert et al. |
| 2005/0055590 A1 | 3/2005 | Farkas et al. |
| 2005/0102539 A1 | 5/2005 | Hepner et al. |
| 2005/0115945 A1 | 6/2005 | Kesteren et al. |
| 2005/0132371 A1 | 6/2005 | Lopez-Estrada |
| 2005/0136989 A1 | 6/2005 | Dove |
| 2005/0138440 A1 | 6/2005 | Barr et al. |
| 2005/0143865 A1 | 6/2005 | Gardner |
| 2005/0149540 A1 | 7/2005 | Chan et al. |
| 2005/0182986 A1 | 8/2005 | Anderson et al. |
| 2005/0196662 A1 | 9/2005 | Prema et al. |
| 2005/0210304 A1 | 9/2005 | Hartung et al. |
| 2005/0240786 A1 | 10/2005 | Ranganathan |
| 2005/0278556 A1 | 12/2005 | Smith et al. |
| 2006/0005057 A1 | 1/2006 | Nalawadi et al. |
| 2006/0006166 A1 | 1/2006 | Chen et al. |
| 2006/0013281 A1* | 1/2006 | Sri-Jayantha et al. ........ 374/163 |
| 2006/0036878 A1 | 2/2006 | Rothman et al. |
| 2006/0047983 A1 | 3/2006 | Aleyraz et al. |
| 2006/0168456 A1 | 7/2006 | Chaudhry et al. |
| 2006/0190745 A1 | 8/2006 | Matsushima et al. |
| 2006/0190749 A1 | 8/2006 | He et al. |
| 2006/0239328 A1* | 10/2006 | Sumi ............................... 374/43 |
| 2006/0248354 A1 | 11/2006 | Pineda de Gyvez |
| 2006/0288241 A1 | 12/2006 | Felter et al. |
| 2006/0294400 A1 | 12/2006 | Diefenbaugh et al. |
| 2007/0016706 A1 | 1/2007 | Arnold et al. |
| 2007/0049134 A1 | 3/2007 | Conroy et al. |
| 2007/0050644 A1 | 3/2007 | Merkin |
| 2007/0050646 A1 | 3/2007 | Conroy et al. |
| 2007/0050647 A1 | 3/2007 | Conroy et al. |
| 2007/0067136 A1 | 3/2007 | Conroy et al. |
| 2007/0083779 A1 | 4/2007 | Misaka et al. |
| 2007/0101173 A1 | 5/2007 | Fung |
| 2007/0255972 A1 | 11/2007 | Gaskins et al. |
| 2008/0276111 A1 | 11/2008 | Jacoby et al. |
| 2009/0177422 A1 | 7/2009 | Cox et al. |
| 2009/0177907 A1 | 7/2009 | Sotomayor, Jr. et al. |
| 2009/0299543 A1 | 12/2009 | Cox et al. |
| 2010/0040085 A1 | 2/2010 | Olderdissen et al. |

FOREIGN PATENT DOCUMENTS

| | | |
|---|---|---|
| EP | 0404567 A1 | 12/1990 |
| EP | 0632 360 A1 | 1/1995 |
| EP | 1231695 A2 | 8/2002 |
| EP | 1286456 A1 | 2/2003 |
| EP | 1 762 924 * | 3/2007 |
| EP | 1762924 A1 | 3/2007 |
| GB | 2405236 A | 2/2005 |
| JP | 62162565 | 7/1987 |
| JP | 2002-175131 | 6/2002 |
| KR | 20020002799 | 1/2002 |
| WO | WO 03/060678 A2 | 7/2003 |
| WO | WO 2007/024403 A2 | 3/2007 |

OTHER PUBLICATIONS

PCT International Search Report and Written Opinion (dated Mar. 11, 2009), International Application No. PCT/US2009/041036, International Filing Date—Apr. 17, 2009, 20 pages.

PCT International Search Report and Written Opinion (dated Nov. 11, 2010), International Application No. PCT/US2009/060253, International Filing Date—Sep. 10, 2009, (18 pages).

PCT International Report on Patentability and Written Opinion (dated Nov. 30, 2010), International Application No. PCT/US2009/041036, International Filing Date—Apr. 17, 2009, (11 pages).

PCT International Preliminary Report on Patentability (dated Apr. 28, 2011), International Application No. PCT/US2009/060253 (12 pages).

PCT International Preliminary Report on Patentability and Written Opinion for PCT International Application No. PCT/US2006/029244, mailed Mar. 6, 2008, 14 pages.

PCT International Search Report and Written Opinion for PCT International Application No. PCT/US2008/013975 mailed Mar. 17, 2009, 13 pages.

PCT International Preliminary Report and Written Opinion for PCT International Application No. US2006/029049 mailed Nov. 29, 2006, 14 pages.

PCT Preliminary Report on Patentability and Written Opinion for PCT International Application No. PCT/US2006/029049, mailed Mar. 6, 2008, 10 pages.

PCT International Search Report and Written Opinion for PCT International Application No. US2008/014036 mailed Jul. 22, 2010, 14 pages.

PCT Search Report and Written Opinion for PCT/US2006/029244, mailed Sep. 17, 2007, 22 pages.

* cited by examiner

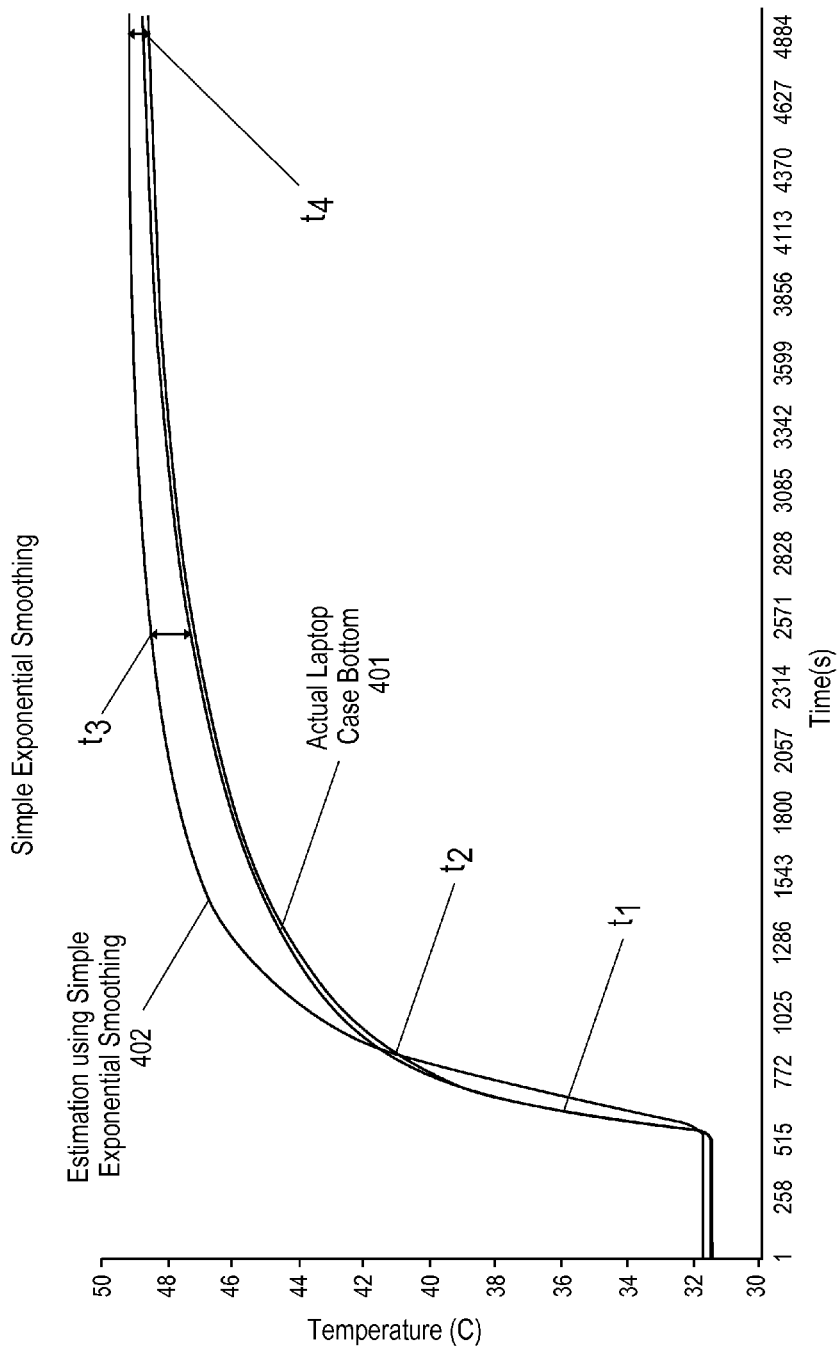

METHOD FOR ESTIMATING TEMPERATURE AT A CRITICAL POINT

FIELD OF THE INVENTION

At least certain embodiments of the invention relate generally to data processing systems, and more particularly but not exclusively to the estimation of temperatures in data processing systems.

BACKGROUND OF THE INVENTION

Computer systems are designed to be able to continuously operate under varying degrees of thermal loading. As the operating power consumption of computer systems creeps upwards, the thermal budgets of these systems have become tighter. It is now a challenge to design a computer system to operate continuously under worst-case thermal loading for extended periods of time, while at the same time both maintaining a desired range of operating performance and maintaining the temperature of the computer housing within safety limits.

Further, computer systems are being packed into smaller profile housing to improve portability. As a result, many electronic devices have "hotspots" where there is a potential to overheat and cause injury to the person using the electronic device. These hotspots are the result of computer systems such as laptop computers having both compact housing (also called skin) and limited cooling capacity. The UL and other government bodies establish safety standards for products. As a result, manufacturers of computer systems and other electronic products are required to limit the skin temperature to levels within government approved safety limits so that they are free from reasonably foreseeable risks of fire, burn and other related hazards.

To resolve thermal issues, several proactive measures have been developed including thermal-throttling, engaging cooling fans, providing heat exhaust pipes, managing and redistributing power, switching from external graphics to internal graphics, and etcetera. Many systems designed today require these proactive measures to provide adequate performance under various thermal conditions. Temperature sensors may be used to determine the ambient temperature of the working environment of computer systems. Thermal models may then be developed based on data collected from these temperature sensors.

However, temperature sensors are often implemented as integrated circuits which can only be placed at a limited number of locations around the computer system and its skin. Also, thermal sensors can be integrated circuits, so using a large number of thermal sensors may in some cases be cost-prohibitive. FIG. 1 illustrates an example of a location to measure ambient temperature for thermal control. In the illustrated embodiment, temperature sensor 101 is positioned in the middle portion of the display panel of a portable computer 100. Temperature sensors may be placed in various places within a computer system such as, for example, on the microprocessor (CPU) die, in the proximity of the CPU die (CPU Prox), on known hotspots such as a motherboard, on a hard drive device, on a heat pipe, on a battery, on a track pad, and etcetera.

Often, a hotspot may be located on a particular point where it is difficult to put a sensor such as the bottom case of a laptop computer system. These points may be generally referred to as critical points. Thermal models may be generated to accurately estimate the temperature at these critical points based on data received from temperature sensors to estimate the temperature at the critical point. These thermal models may be generated so that proactive measures may be taken to mitigate the thermal behavior at hotspots such as turning on the system fans and so on.

SUMMARY OF THE DESCRIPTION

At least certain embodiments of the invention disclose methods and apparatuses to estimate temperature at one or more critical points or locations in a data processing system including generating a representation of a thermal model at the one or more critical points, the thermal model using a filtering algorithm to filter at least one temperature sensor at a plurality of frequencies to compensate for time-based under estimation and over estimation in the thermal model. The thermal model can then be stored as one or more equations which can be used at runtime to predict a current and/or future temperature at a critical point on a data processing system. The filtering algorithm (or alternative algorithm) is used to create a model of a transient temperature curve (or other representation) at the one or more critical points. The thermal model can be generated by merging a model of a steady state temperature curve (or other representation) with the thermal model of the transient temperature curve (or other representation). The merged model may be used for a variety of different data processing systems in a class of data processing systems (e.g., a set of laptop computers having a certain housing and display, but different microprocessors or other internal differences); the merged model may be stored as one or more equations in a memory of such a system.

Additionally, some embodiments include methods and apparatuses to generate a future thermal model based on the thermal model to predict future temperatures at the critical point based on the future thermal model. These future predictions may be used to perform proactive measures to reduce temperature at the critical point based on the future temperature model. These proactive measures may include any one or more of thermal-throttling the data processing system, engaging cooling fans, managing and redistributing power, and switching from external graphics to internal graphics.

BRIEF DESCRIPTION OF THE DRAWINGS

A better understanding of at least certain embodiments of the invention can be obtained from the following detailed description in conjunction with the following drawings, in which:

FIG. 4 illustrates the problem of underestimation and overestimation using simple exponential smoothing.

DETAILED DESCRIPTION

Figure 1:
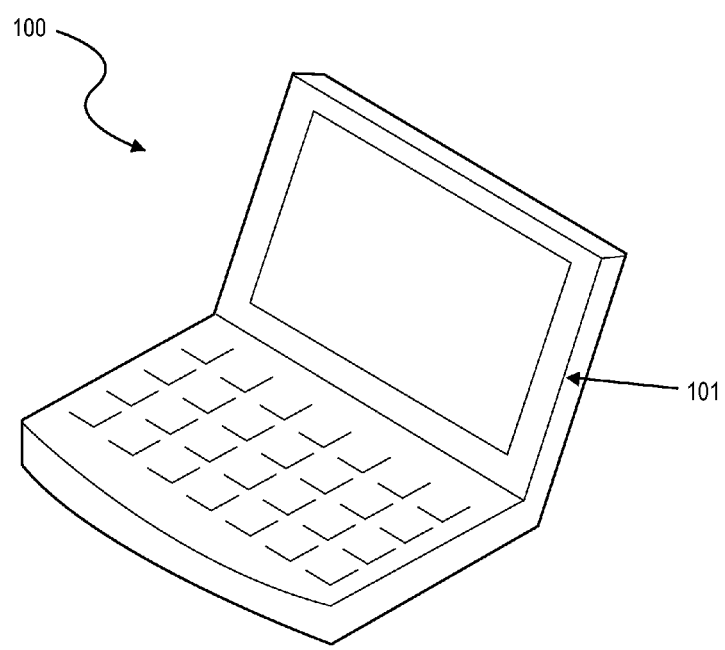
FIG. 1 illustrates an example of a location to measure ambient temperature for thermal control.

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of embodiments of the present invention.

Methods and apparatuses for estimating temperature at a critical point (e.g., the bottom outside housing of a laptop computer) are described. At least certain embodiments of the invention disclose a method and apparatus to estimate temperature at a critical point in a data processing system including receiving temperature data from temperature sensors, separating the estimation of the steady state temperature curve from the estimation of the transient temperature curve at the critical point, and merging the model of the steady state temperature curve with the model of the transient temperature curve to generate a thermal model of the temperature at the critical point. These embodiments may then estimate the instantaneous temperature at the critical point based on the thermal model generated from the merging.

In addition, some embodiments generate a future thermal model based on the thermal model to predict future temperatures at the critical point. These future temperature predictions may them be used to initiate proactive measures to reduce temperature at the critical point or to run the system at higher performance levels while still keeping the temperature at the critical point below an acceptable level. These proactive measures may include any one or more of thermal-throttling the data processing system, engaging cooling fans, providing heat exhaust pipes, managing and redistributing power, and switching from external graphics to internal graphics.

It is often desired to determine the temperature of critical points like the bottom case of a laptop computer or portable Personal Digital Assistant (PDA) device or other device such as a handheld computer or wireless telephone where it is difficult to put a temperature sensor. Thus, the temperature at the critical point (where there is no temperature sensor) may be estimated based on the temperature at a known point such as a temperature sensor. Direct and indirect thermal models may be developed to model temperature in a data processing system and to determine the desired temperature at the critical point based on the thermal behavior at a plurality of temperature sensors that may be located in various locations within the data processing system. Direct modeling uses the instantaneous power, ambient temperature, and air flow, whereas indirect modeling requires estimating the critical temperature with the help of the temperature sensors placed in feasible places. The presence of compounding factors like the distribution of the power in the system, inability to measure room temperature accurately, etcetera, result in a far too complex model resulting in inaccuracy in the direct modeling case. Additionally, the models developed using direct modeling fail to generalize well from one data processing system to other data processing systems.

One method of performing indirect thermal modeling includes performing regression analysis. Regression analysis may be used to estimate the thermal behavior at the particular critical point based on the known thermal behavior at the thermal sensors. Data regression analysis is a technique used for modeling and analysis of numerical data consisting of values of a dependent variable (response variable) and of one or more independent variables (explanatory variables). The dependent variable in the regression equation is modeled as a function of the independent variables, corresponding constants plus an error term. The error term is treated as a random variable representing unexplained variation in the dependent variable. The parameters are estimated so as to give a "best fit" of the data. Most commonly the best fit is evaluated by using the least squares method, but other criteria have also been used. Regression can be used for prediction (including forecasting of time-series data), inference, hypothesis testing, and modeling of causal relationships.

Figure 2:
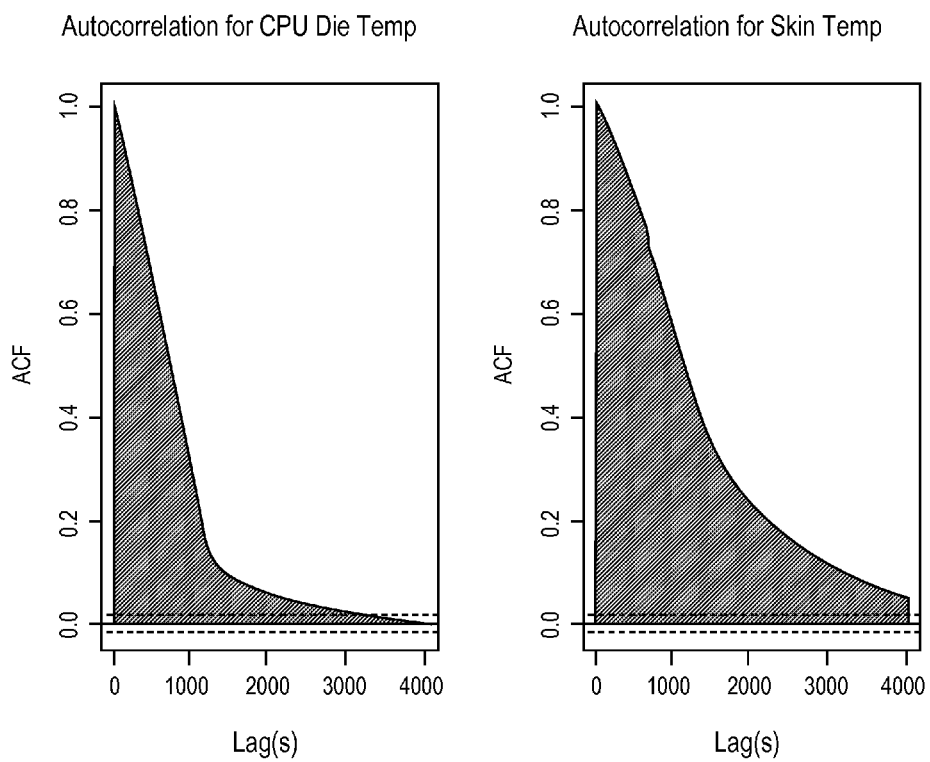
FIG. 2 illustrates an autocorrelation of a CPU die sensor and a skin temperature of a computer or other data processing system.

These uses of regression rely heavily on the underlying assumptions being satisfied. However, the errors between the temperature at a particular sensor and the temperature at the critical point violate the underlying assumptions of regression analysis because the errors are correlated in time. FIG. 2 which illustrates the autocorrelation of a CPU die sensor and the skin temperature of a computer or other data processing system. As can be seen, the errors between the two autocorrelation functions vary with time and a fundamental assumption of regression analysis is that errors do not correlate in time. Thus, linear regression analysis yields unsatisfactory results since the fundamental assumption of linear regression is violated.

Another option is to perform techniques such as Multivariate Time Series Analysis like vector autoregression functions, and etcetera. However, these generally result in models that are computationally prohibitive to use in real time.

At least certain embodiments of the invention include separating the steady state temperature estimation from the transient temperature estimation so that regression analysis techniques may be performed to model the steady state temperature because the steady state temperature does not very in time; and as a result, standard regression analysis techniques may be used. These embodiments may then use a method referred to as the "Three Frequencies Analysis" or a filtering algorithm or other frequency or time based approaches to approximate the results of the transient response to power fluctuations within the data processing system. Finally, the two approximations are combined to generate a complete thermal model of the temperature at the critical point. This model may then be used to measure the temperature of the critical point at any time instant. Additionally, this thermal model may be modified to generate a fairly accurate prediction of temperature at the critical point. This information may then be leveraged to take proactive measures to mitigate the temperature at a critical point. This is especially important when the critical point is a hotspot on the data processing device such as the bottom of a laptop or PDA.

Figure 3A:
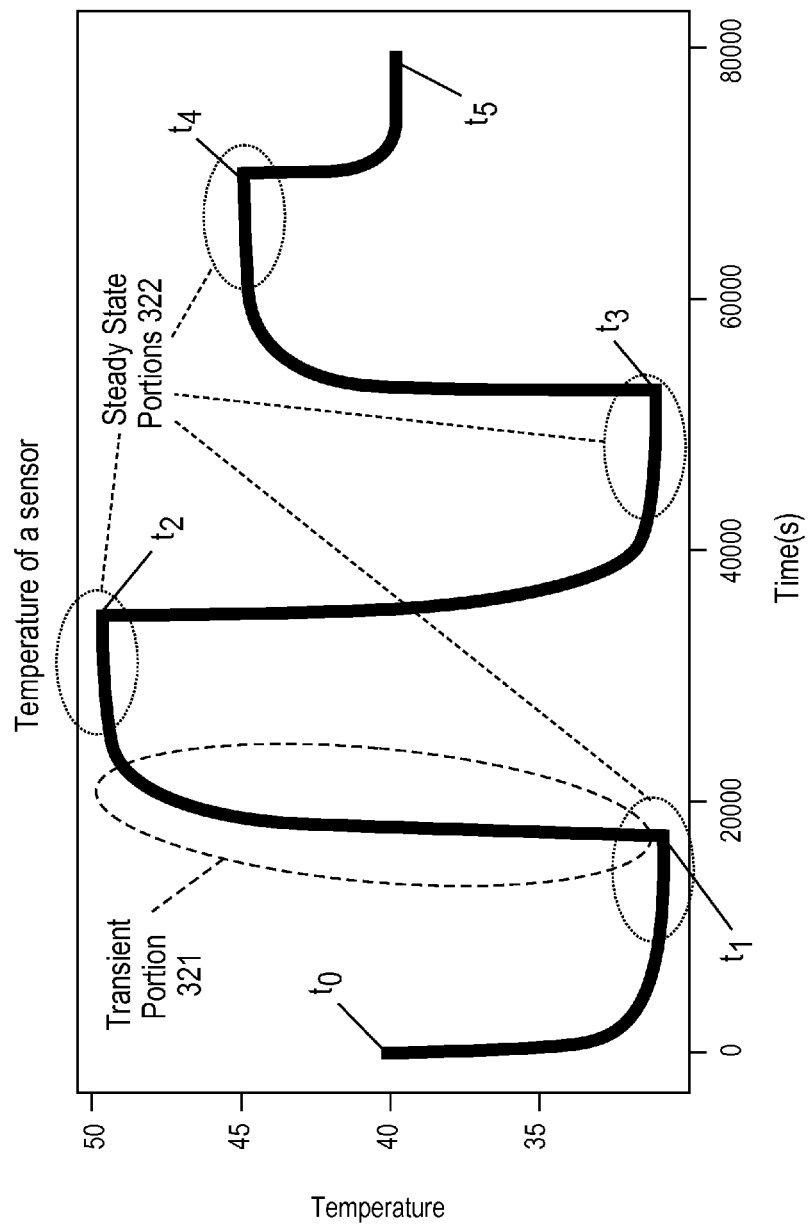
FIG. 3A illustrates a graph of a curve generated by actual data from a thermocouple device connected to the critical point.

FIG. 3A illustrates a graph of a curve generated by actual data from a thermocouple device connected to the critical point. In this figure, power is applied at various levels to a hypothetical data processing system and then subsequently removed. This graph shows the temperature in response to the applied power over time. At time t0, power is removed from the system and the temperature begins decreasing toward the steady state value when no power is applied. This steady state is reached at time t1 where all power has been removed from the system for a long period of time. This is the first steady state portion of the graph. Power is subsequently applied to the system and the temperature rises accordingly until it reaches a different steady state temperature at time t2. Transition portion 321 illustrates this increase in temperature over time. The steady state temperature at time t2 may be, for example, the steady state at full operation of the data processing system including CPU power, hard drives, monitor, and etcetera. After this time, power is once again removed from the system and the temperature decreases to a third steady state value at time t3. This steady state value may be different than the steady state value at time t1. For example, the steady state value may correspond to power applying power to only the hard drives. After time t3, power is reapplied to the system until the temperature reaches another steady state value at time t4. This steady state value may correspond, for example, to powering up the Graphics Processing Unit (GPU) only. After time t4, power is partly removed from the system until the temperature reaches the steady state value at time t5. This steady state value at time t5 may correspond, for example, to powering only one-half of the CPU. Alterative power levels are considered to be within the teachings of this description.

Thus, FIG. 3A demonstrates the actual temperature variation with time of the critical point. However, as discussed above, it may not be feasible to place a sensor at the critical point. In this case, the temperature of the critical point may be approximated using the modeling techniques described herein.

I. Steady State Temperature Estimation

At least certain embodiments describe performing steady state temperature estimation separately from the transient temperature estimation because the errors ($\epsilon$) are not correlated in time at the steady state. The first step may be to pick the minimum number of temperature sensors with which to perform the steady state analysis. This minimum number of temperature sensors may be determined by performing a principal component analysis to select the best set of temperature sensors from which to perform the regression analysis at the critical point. That is, principal component analysis may be performed to determine which temperature sensors are most likely to produce accurate results using regression analysis at the critical point.

Figure 3B:
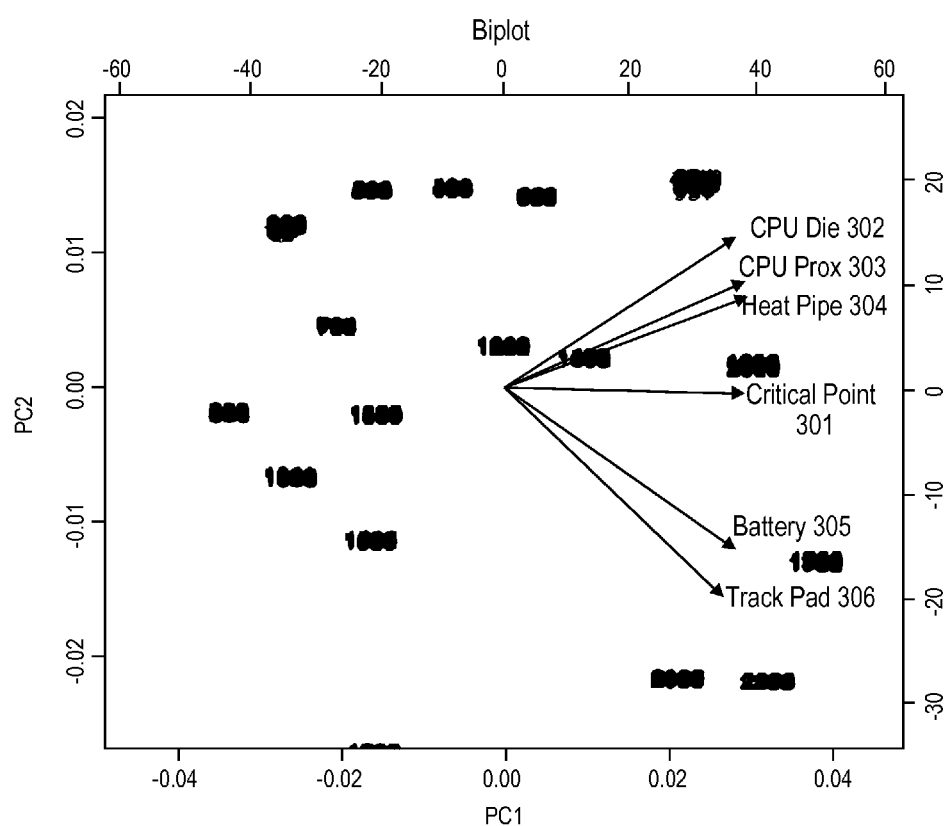
FIG. 3B illustrates a Biplot of the principal components of a set of temperature sensors and the critical point.

FIG. 3B illustrates a Biplot of the principal components of a set of temperature sensors and the critical point. The temperature sensors in the illustrated embodiment include CPU die 302, CPU Prox 303, Heat Pipe 304, Battery 305, and Trackpad 306. However, this is given by way of illustration and not of limitation as any temperature sensors within the data processing systems are contemplated. The direction of each of the vectors in the Biplot corresponds to how the particular temperature sensor or critical point behaves under the application of power to the system. The Biplot indicates that there are two groups of temperature sensors that exhibit similar response to the application of power to the system. The first group consists of the CPU die 302, CPU Prox 303, Heat Pipe 304. The heat sensors in the first group are relatively correlated based on the Biplot because their thermal behavior is similar manner when power is applied to the system. The second group consists of the Battery 305 and Trackpad 306. The heat sensors in the second group are relatively correlated based on the Biplot because their thermal behavior is similar manner when power is applied to the system.

Based on the Biplot, it is clear that the thermal behavior of any of the sensors in the first group is relatively uncorrelated with the thermal behavior of any of the sensors in the second group. In embodiments, the minimum number of sensors may be a pair of sensors such that the pair explains the maximum variance with respect to the critical point. This may yield the best results using regression analysis. In the illustrated embodiment, the pair sensors may include the CPU die 302 and the Track Pad 306 since they are the most divergent sensors in the Biplot. If required, other sensors may be added such that the addition maximizes the adjusted R-squared values when the critical point is regressed on the set of sensors. This may be an iterative process where additional sensors continue to be added until the gain in the adjusted R-squared is negligible.

Once the temperature sensors are chosen, the regression analysis is performed to generate a model of the steady state temperature curve in time. On the steady state response, the generated multivariate linear regression equation may be given by the following equation:

$$\text{CriticalTemp} = \beta_0 + \beta_1 * \text{sensor1} + \beta_2 * \text{sensor2} + \beta_3 * \text{sensor3} + \ldots \beta_N * \text{sensor} N$$

where $\beta_0$ is an initial value and $\beta_1$-$\beta_N$ represent data point weight factors for each of the temperature sensors.

II. Transient Temperature Estimation

Whenever there is a change in applied power, ambient temperature, or airflow to a computer or other data processing system, temperature at each point will require a different time to reach its steady state value. For example, CPU Die 302 sensor's temperature reaches its steady state value far earlier than the laptop bottom case. Hence, if the CPU Die 302 sensor is used for estimating the laptop bottom case (e.g., critical point), then simple exponential smoothing should be performed on its values so that both the CPU die sensor 302 and the critical point follow the same temperature curve characteristics. Unfortunately, simple exponential smoothing does not perform well. Simple exponential smoothing tends to underestimate the temperature during the start of the temperature transition and overestimate near the middle of the temperature curve. This is demonstrated in FIG. 4. FIG. 4 illustrates the problem of underestimation and overestimation using simple exponential smoothing. In the figure, the results of the estimation using exponential smoothing are compared to the temperature curve of the actual critical point such as laptop case bottom for example. At time t1, the divergence is readily apparent since the estimated curve lags the actual curve of the critical point temperature. This results in an underestimation of critical point temperature and a time lag which may be as much as thirty (30) minutes. At time t2, the two graphs cross and the estimated curve begins to overestimate the temperature at the actual critical point. At time t3, the temperature transition begins to reach the steady state value (where errors do not correlate in time), so the overestimation begins to be reduced, and at time t4, the steady state is almost reached and the exponential smoothing begins to accurately predict the actual temperature of the critical point.

Figure 5A:
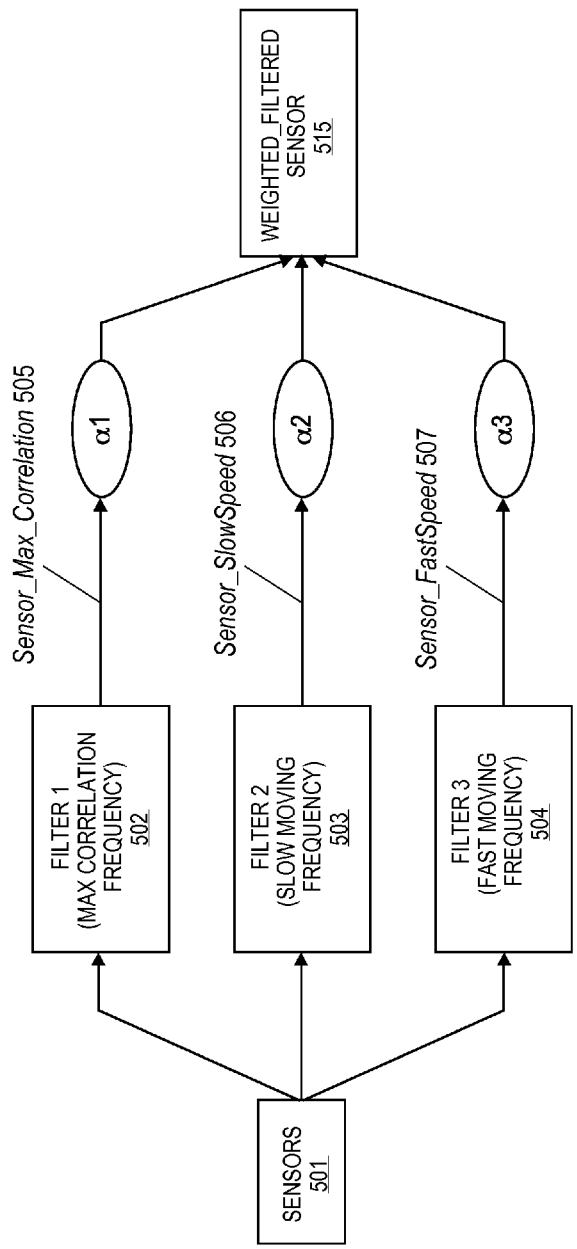
FIG. 5A illustrates the three frequencies algorithm according to an exemplary embodiment of the invention.

At least certain embodiments describe a new curve fitting algorithm referred to as the "Three Frequencies Algorithm" to estimate the transient temperature curve at a critical point in a data processing system. The new algorithm is based on analyzing the temperature curve using, in one embodiment, the Three Frequencies algorithm. FIG. 5A illustrates the three frequencies algorithm according to an exemplary embodiment of the invention. In the figure, each of the temperature sensors picked for the steady state analysis are used to perform the transient analysis. The sensors 501 are input into three filters at three different frequencies including a maximum correlation frequency filter 502, a slow-moving frequency filter 503, and a fast-moving frequency filter 504. In the preferred embodiment, these filters may be infinite impulse response filters (IIR). However, other frequency filters are contemplated within the teachings of this description.

Figure 5B:
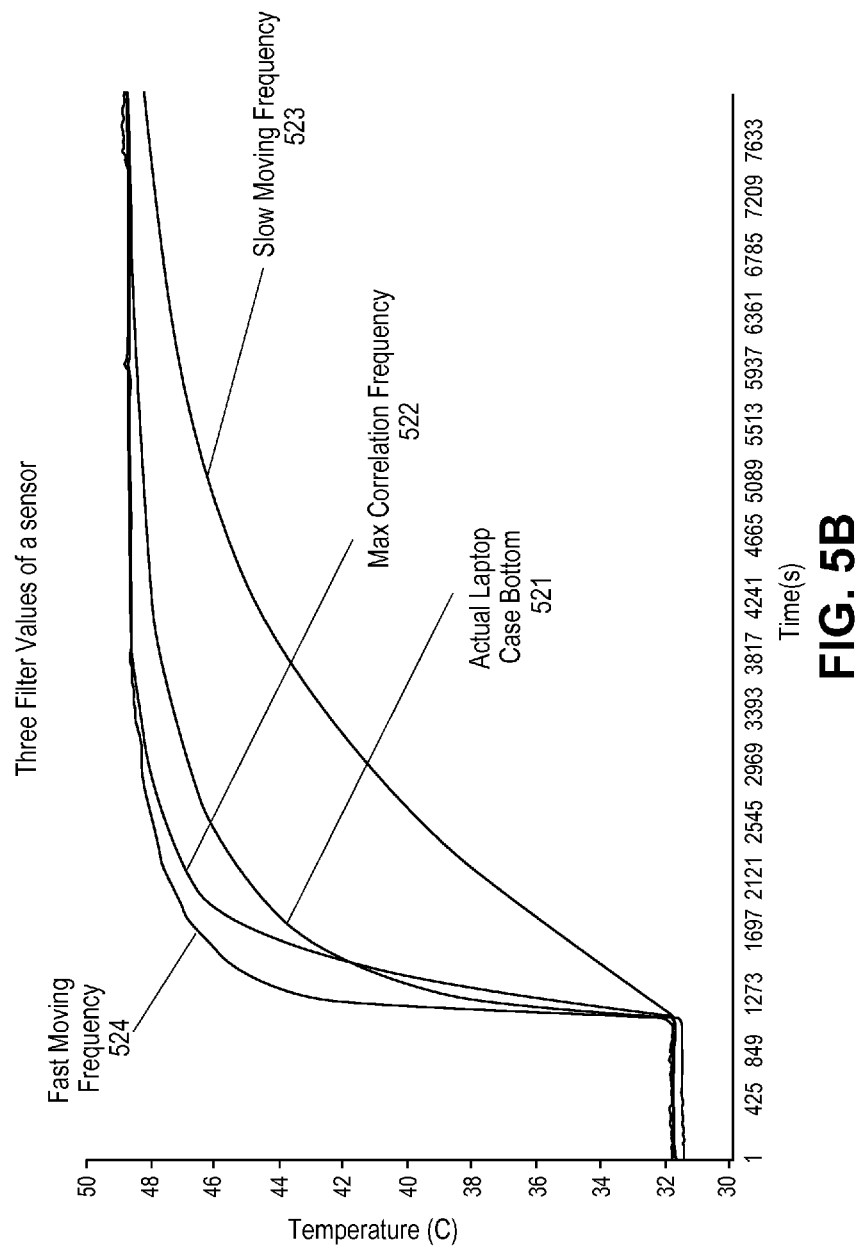
FIG. 5B illustrates the respective temperature curves at each of the three frequencies with respect to the actual temperature curve of the critical point according to an exemplary embodiment of the invention.

The maximum correlation frequency provides the necessary shape of the overall temperature curve, whereas the fast-moving frequency removes the underestimation from the start of the temperature curve and the slow-moving frequency removes the overestimation at the middle of the temperature curve. The respective temperature curves at each of the three frequencies with respect to the actual temperature curve of the critical point according to an exemplary embodiment of the invention are illustrated in FIG. 5B. In the figure, the maximum correlation frequency temperature curve 522 provides the necessary shape of the overall temperature curve, the fast-moving frequency temperature curve 524 removes the underestimation from the start of the temperature curve, and the slow-moving frequency temperature curve 523 removes the overestimation at the middle of the temperature curve. The maximum correlation frequency may correspond to the skin of the data processing system that has some thermal mass. The slow-moving frequency may correspond to the table or other external item upon which the data processing system such as a laptop computer is located. Finally, the fast-moving frequency may correspond to localized heating and is direct and immediate.

The three filtered values in FIG. 5A include Sensor_Max_Correlation 505, Sensor_SlowSpeed 506, and Sensor_FastSpeed 507. These three filtered values are then combined in a weighted manner by coefficients $\alpha_1$, $\alpha_2$ and $\alpha_3$ to obtain weighted_filtered sensor 515 as shown in FIG. 5A resulting in a temperature curve that accurately models to the actual critical point temperature curve with at least some of the underestimation and overestimation in the resulting temperature curve removed. The three frequencies and their corresponding weights may be determined using an algorithm as follows:

1. Find $\alpha_{max\_correlation}$ such that it maximizes the correlation between the filtered sensor value and the actual thermocouple at the critical point.
   The filtered sensor value is calculated as:

$$\text{Sensor\_Max\_Correlation}_t = \alpha_{max\_correl} * \text{sensor}_t + (1 - \alpha_{max\_correl}) * \text{Sensor\_Max\_Correlation}_{t-1};$$

2. Find $\alpha_{slow\_freq}$ ($> \alpha_{max\_correlation}$) such that it maximizes the adjusted R-squared when the actual thermocouple at the critical point is explained using Sensor_Max_Correlation and Sensor_SlowSpeed.
   The filtered value may be calculated as:

$$\text{Sensor\_SlowSpeed}_t = \alpha_{slow\_freq} * \text{sensor}_t + (1 - \alpha_{slow\_freq}) * \text{Sensor\_SlowSpeed}_{t-1};$$

3. Find $\alpha_{fast\_freq}$ ($> \alpha_{max\_correlation}$) such that it maximizes the adjusted R-Squared when the actual thermocouple at the critical point is explained using Sensor_MaxCorrelation, Sensor_SlowSpeed and Sensor_FastSpeed.
   The filtered value may be calculated as:

$$\text{Sensor\_FastSpeed}_t \alpha_{fast\_freq} * \text{sensor}_t + (1 - \alpha_{fast\_freq}) * \text{Sensor\_FastSpeed}_{t-1}.$$

Figure 5C:
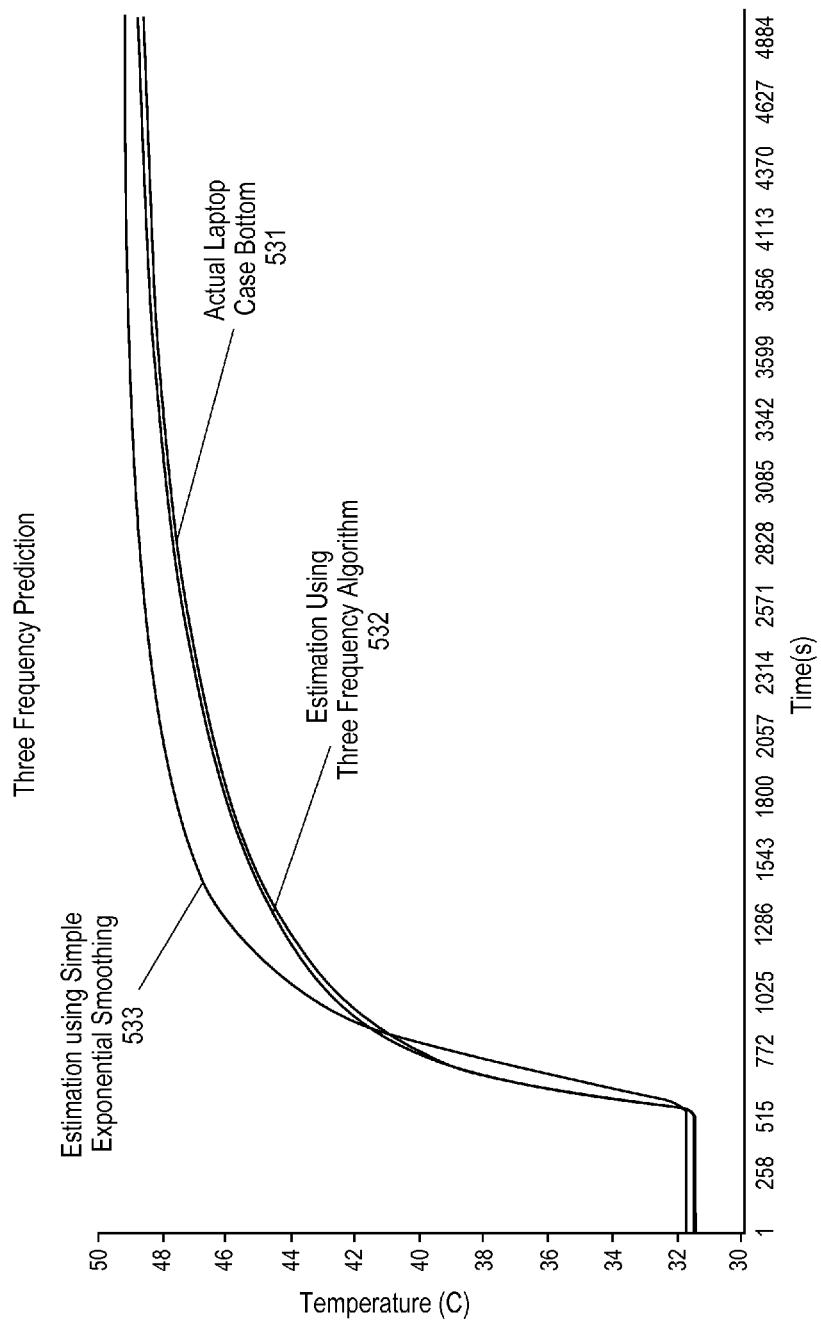
FIG. 5C illustrates an estimation of the actual critical point temperature curve using the three frequencies algorithm according to an exemplary embodiment of the invention.

However, any error gradient descent algorithm may be used and is contemplated within the teachings of this description. The weights $\alpha_{max\_correl}$, $\alpha_{slow\_freq}$, and $\alpha_{fast\_freq}$ of the three frequencies respectively are, in at least certain embodiments, in proportion to the coefficients obtained after fitting a regression equation on the actual thermocouple data and the three frequencies values (Sensor_Max_Correlation, Sensor_SlowSpeed, Sensor_FastSpeed). This resulting curve is shown in FIG. 5C, which illustrates an estimation of the actual critical point temperature curve using the three frequencies algorithm according to an exemplary embodiment of the invention. In the figure, it is noted that the estimation using the three frequencies algorithm 532 provides a much more accurate model of the actual critical point (e.g., laptop case bottom) temperature curve 531 than the temperature estimation curve 533 using simple exponential smoothing (e.g., linear regression analysis).

The resulting equation using the three frequencies algorithm may include the equation:

$$\text{Sensor1\_Filter} = \alpha_1 * \text{sensor1@Freq1} + \alpha_2 * \text{sensor1@Freq2} + \alpha_3 * \text{sensor1@Freq3}.$$

This equation may then be merged with the equation for the temperature curve obtained using the steady state analysis to yield the overall thermal model equation as follows:

$$\text{CriticalTemp} = \beta_0 + \beta_1 * \text{sensor1\_Filter} + \beta_2 * \text{sensor2\_Filter} + \beta_3 * \text{sensor3\_Filter} + \ldots \beta_N * \text{sensor}N\_\text{Filter}.$$

Figure 6A:
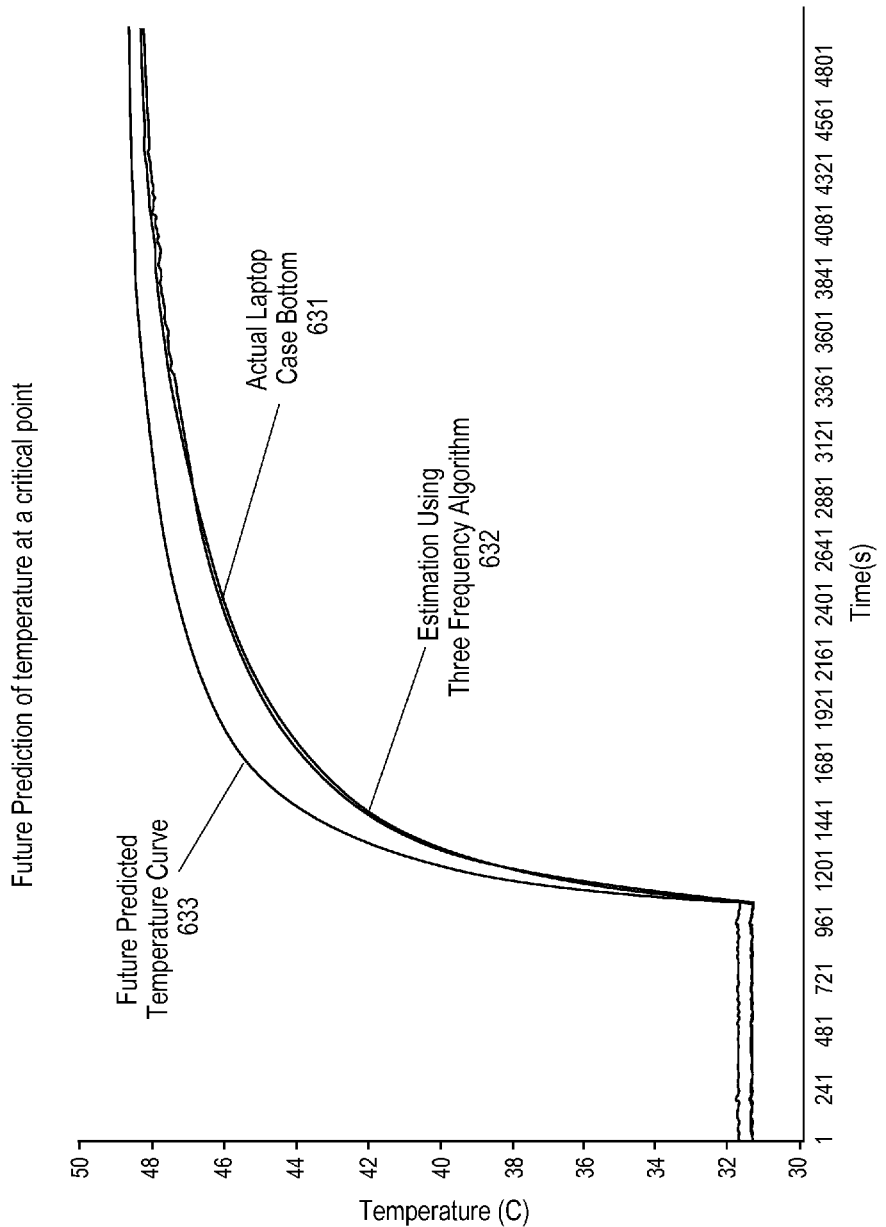
FIG. 6A illustrates predicting future values of temperature at a critical point using the three frequencies algorithm according to an exemplary embodiment of the invention.

The teachings of this description may also use the Three Frequencies Algorithm to predict the "future" temperature at a critical point. This can be achieved either by simply changing the weight of the three frequencies generated by the algorithm or by refitting the whole time-shifted temperature curve. FIG. 6A illustrates predicting future values of temperature at a critical point using the three frequencies algorithm according to an exemplary embodiment of the invention. In the figure, the future predicted value of temperature at the critical point is obtained after changing the weight of the three frequencies. The actual critical point temperature curve 631, the temperature curve estimated using the Three Frequencies Algorithm 632, and the future predicted temperature curve 633 are each marked in FIG. 6A respectively. In the illustrated embodiment, the future predicted value curve 633 reaches the stable point far earlier than the actual temperature curve 631. This fact can be exploited to take proactive measures like bringing on the cooling fans a bit earlier, redistributing the power, or switching from external graphics to internal graphics, and so on.

Figure 6B:
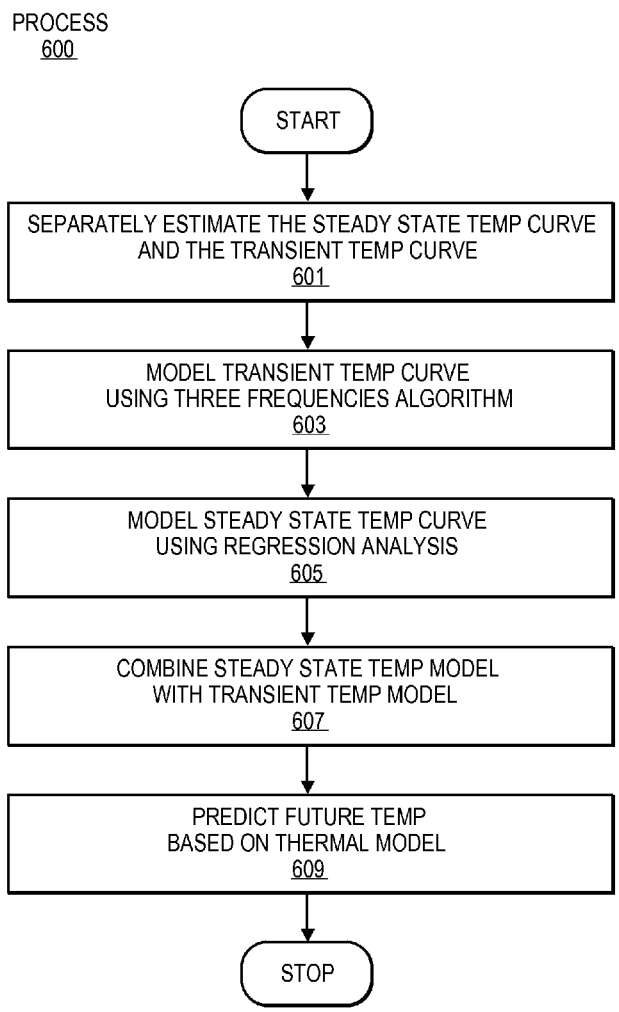
FIG. 6B illustrates a method of estimating temperature at a critical point using the three frequencies algorithm according to an exemplary embodiment of the invention.

FIG. 6B illustrates a method of estimating temperature at a critical point using the three frequencies algorithm according to an exemplary embodiment of the invention. Process 600 begins at operation 601 where the estimation analysis of the steady state and transient temperature curves at the critical point are separated. Process 600 continues with modeling the transient temperature curve using the three frequencies algorithm described above (or using other algorithms to create a model of the transient temperature curve or change) at operation 603 and modeling the steady state temperature curve using regression analysis at operation 605. Process 600 continues at operation 607 where the results of the separately estimated steady state analysis and the transient analysis are combined to generate the complete thermal model at the critical point. Optionally, process 600 concludes with using the thermal model of operation 607 to predict the temperature of the critical point at a future time. Operations 601, 603, 605 and 607 can be performed in a research and development phase of a product's development to produce a complete or merged thermal model for one or more data processing systems; this phase can include building prototypes of such systems and taking temperature measurements of the prototypes at points other than the critical points (and optionally also at the critical point using a mechanical thermocouple connected to the critical point since the critical point may not have an attached temperature sensor) and then generating both the transient temperature portion of the thermal model and the steady state portion of the thermal model from the measured temperatures. Once the merged thermal model is generated, it can be stored in memory in the one or more data processing systems which are manufactured for distribution to customers so that the stored representation of the merged model can be used at runtime of these manufactured systems.

The complete thermal model may be created for a class of data processing systems (e.g., a set of laptop computers having a similar housing and display but with a different microprocessor or other internal differences) and represented in one or more equations stored in a memory of such systems; a microprocessor coupled to the memory in such systems can use current temperature measurements, at points other than the critical point, to predict the current and/or future temperatures at the critical point.

Figure 7:
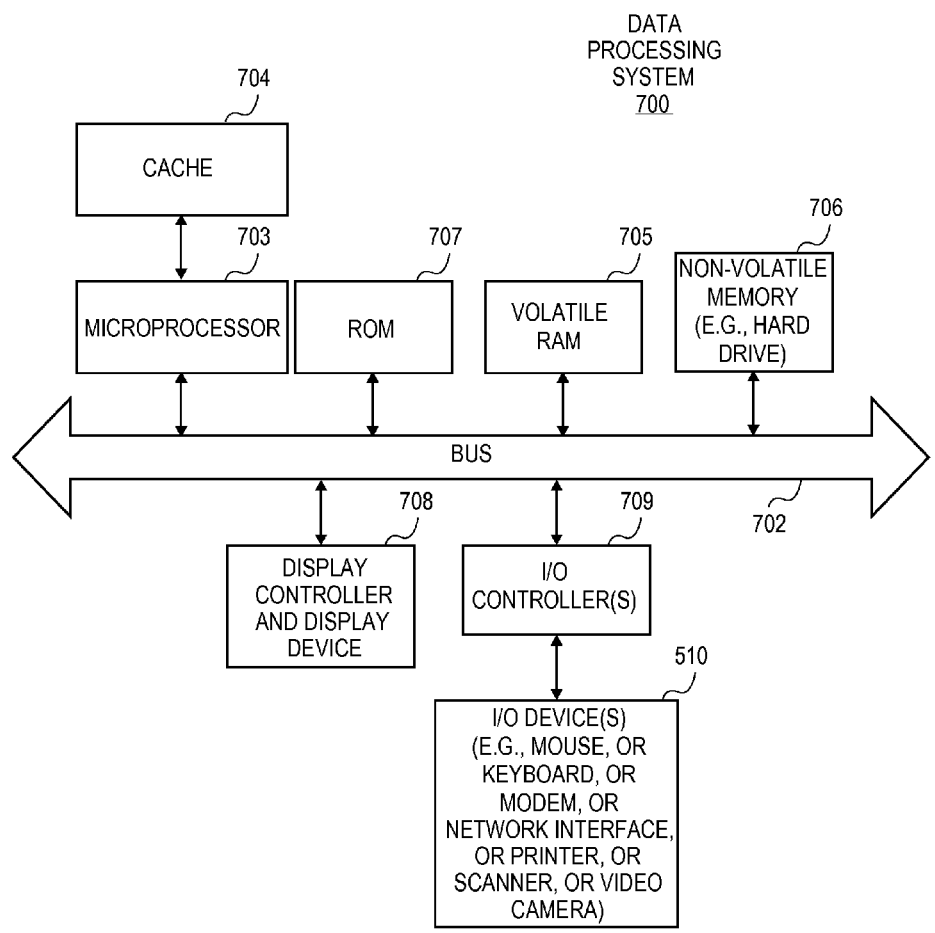
FIG. 7 illustrates an exemplary data processing system upon which the methods and apparatuses of the invention may be implemented.

FIG. 7 shows one example of a typical data processing system, such as data processing system 700, which may be used with the present invention. Note that while FIG. 7 illustrates various components of a data processing system, it is not intended to represent any particular architecture or manner of interconnecting the components as such details are not germane to the present invention. It will also be appreciated that network computers and other data processing systems which have fewer components or perhaps more components may also be used. The data processing system of FIG. 7 may, for example, be a workstation, or a personal computer (PC) running a Windows operating system, or an Apple Macintosh computer.

As shown in FIG. 7, the data processing system 701 includes a system bus 702 which is coupled to a microprocessor 703, a ROM 707, a volatile RAM 705, and a non-volatile memory 706. The microprocessor 703, which may be a processor designed to execute any instruction set, is coupled to cache memory 704 as shown in the example of FIG. 7. The system bus 702 interconnects these various components together and also interconnects components 703, 707, 705, and 706 to a display controller and display device 708, and to peripheral devices such as input/output (I/O) devices 710, such as keyboards, modems, network interfaces, printers, scanners, video cameras and other devices which are well known in the art. Typically, the I/O devices 710 are coupled to the system bus 702 through input/output controllers 709. The volatile RAM 705 is typically implemented as dynamic RAM (DRAM) which requires power continually in order to refresh or maintain the data in the memory. The non-volatile memory 706 is typically a magnetic hard drive or a magnetic optical drive or an optical drive or a DVD RAM or other type of memory systems which maintain data even after power is removed from the system. Typically, the non-volatile memory 706 will also be a random access memory although this is not required. While FIG. 7 shows that the non-volatile memory 706 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface (not shown). The system bus 702 may include one or more buses connected to each other through various bridges, controllers and/or adapters (not shown) as is well known in the art. In one embodiment the I/O controller 709 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software, hardware, firmware, or in combination thereof. That is, the techniques may be carried out in a computer system or other data processing system in response to its processor, such as a microprocessor, executing sequences of instructions contained in a memory, such as ROM 707, volatile RAM 705, non-volatile memory 706, cache 704, or a remote storage device (not shown). In various embodiments, hardwired circuitry may be used in combination with software instructions to implement the present invention. Thus, the techniques are not limited to any specific combination of hardware circuitry and software or to any particular source for the instructions executed by the data processing system 700. In addition, throughout this description, various functions and operations are described as being performed by or caused by software code to simplify description. However, those skilled in the art will recognize that what is meant by such expressions is that the functions result from execution of code by a processor, such as the microprocessor 703.

A machine readable medium can be used to store software and data which when executed by the data processing system 700 causes the system to perform various methods of the present invention. This executable software and data may be stored in various places including for example ROM 707, volatile RAM 705, non-volatile memory 706, and/or cache 704 as shown in FIG. 7. Portions of this software and/or data may be stored in any one of these storage devices.

The invention also relates to apparatus for performing the operations herein. This apparatus may be specially constructed for the required purposes, or it may comprise a general purpose computer selectively activated or reconfigured by a computer program stored in the computer. Such a computer program may be stored or transmitted in a machine-readable medium. A machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media such as, but not limited to, a machine-readable storage medium (e.g., any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions), or a machine-readable transmission medium such as, but not limited to, any type of electrical, optical, acoustical or other form of propagated signals (e.g., carrier waves, infrared signals, digital signals, etc.).

Additionally, it will be understood that the various embodiments described herein may be implemented with data processing systems which have more or fewer components than system 700; for example, such data processing systems may be a cellular telephone or a personal digital assistant (PDA) or an entertainment system or a media player (e.g., an iPod) or a consumer electronic device, etc., each of which can be used to implement one or more of the embodiments of the invention.

Throughout the foregoing specification, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. When a particular feature, structure, or characteristic is described in connection with an embodiment, it is submitted that it is within the knowledge of one skilled in the art to bring about such a feature, structure, or characteristic in connection with other embodiments whether or not explicitly described. Various changes may be made in the structure and embodiments shown herein without departing from the principles of the invention. Further, features of the embodiments shown in various figures may be employed in combination with embodiments shown in other figures.

In the description as set forth above and claims, the terms "coupled" and "connected," along with their derivatives, may be used. It should be understood that these terms are not intended to be synonymous with each other. Rather, in particular embodiments, "connected" is used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some portions of the detailed description as set forth above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion as set forth above, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to apparatus for performing the operations herein. This apparatus may be specially constructed for the required purposes, or it may comprise a general purpose computer selectively activated or reconfigured by a computer program stored in the computer. Such a computer program may be stored or transmitted in a machine-readable medium, such as, but is not limited to, a machine-readable storage medium (e.g., any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions), or a machine-readable transmission medium such as, but not limited to, any type of electrical, optical, acoustical or other form of propagated signals (e.g., carrier waves, infrared signals, digital signals, etc.).

The algorithms and displays presented herein are not inherently related to any particular computer system or other apparatus. Various general purpose systems may be used with programs in accordance with the teachings herein, or it may prove convenient to construct more specialized apparatuses to perform the method operations. The structure for a variety of these systems appears from the description above. In addition, the invention is not described with reference to any particular programming language. It will be appreciated that a variety of programming languages may be used to implement the teachings of the invention as described herein.

Embodiments of the invention may include various operations as set forth above or fewer operations or more operations or operations in an order which is different from the order described herein. The operations may be embodied in machine-executable instructions which cause a general-purpose or special-purpose processor to perform certain operations. Alternatively, these operations may be performed by specific hardware components that contain hardwired logic for performing the operations, or by any combination of programmed computer components and custom hardware components.

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow as well as the legal equivalents thereof.

What is claimed is:

1. A method comprising:
   storing a representation of a thermal model at one or more points of a data processing system in a memory, the thermal model using a filtering algorithm to filter temperature data from at least one temperature sensor at a plurality of frequencies to compensate for time-based under estimation and over estimation in the thermal model, the thermal model having a steady state portion and a transient temperature portion estimated separately from each other;
   applying power to the data processing system;
   receiving the temperature data from the at least one temperature sensor in response to the applied power; and
   estimating an instantaneous temperature at the one or more points based on the temperature data by combining the steady state portion and the transient temperature portion of the thermal model.

2. The method of claim 1, wherein the plurality of frequencies includes a set of three frequencies including a maximum correlation frequency, a slow moving frequency, and a fast moving frequency.

3. A method comprising:
   storing a representation of a thermal model at one or more points of a data processing system in a memory, the thermal model using a filtering algorithm to filter temperature data from at least one temperature sensor at a plurality of frequencies to compensate for time-based under estimation and over estimation in the thermal model;
   applying power to the data processing system;
   receiving the temperature data from the at least one temperature sensor in response to the applied power; and
   estimating an instantaneous temperature at the one or more points based on the temperature data using the thermal model, wherein the thermal model of the temperature at the one or more points is generated by merging a transient temperature portion of the thermal model with a steady state portion of the thermal model, wherein there are no temperature sensors located at the one or more points, and wherein the filtering algorithm filters temperatures received from the at least one temperature sensor which is not located at the one or more points.

4. A method comprising:
storing a representation of a thermal model at one or more points of a data processing system in a memory, the thermal model using a filtering algorithm to filter temperature data from at least one temperature sensor at a plurality of frequencies to compensate for time-based under estimation and over estimation in the thermal model;
applying power to the data processing system;
receiving the temperature data from the at least one temperature sensor in response to the applied power; and
estimating an instantaneous temperature at the one or more points based on the temperature data using the thermal model;
storing a representation of a future thermal model at the one or more points of the data processing system in the memory; and
predicting a future temperature at the one or more points using the future thermal model.

5. The method of claim 4, further comprising initiating proactive measures to reduce temperature at the one or more points of the data processing system using the future thermal model, the proactive measures including one or more of the following:
thermal-throttling the data processing system,
engaging cooling fans,
managing and redistributing power, and
switching from external graphics to internal graphics.

6. A non-transitory computer-readable storage medium containing computer instructions stored therein, which when executed by a computer system, cause the computer system to perform a method to estimate temperature at one or more points of the computer system, the method comprising:
storing a representation of a thermal model at the one or more points of the computer system in a memory, the thermal model using a filtering algorithm to filter temperature data from at least one temperature sensor at a plurality of frequencies to compensate for time-based under estimation and over estimation in the thermal model, the thermal model having a steady state portion and a transient temperature portion estimated separately from each other;
applying power to the computer system;
receiving the temperature data from the at least one temperature sensor in response to the applied power; and
estimating an instantaneous temperature at the one or more points based on the temperature data by combining the steady state portion and the transient temperature portion of the thermal model.

7. The computer-readable storage medium of claim 6, wherein the plurality of frequencies includes a set of three frequencies including a maximum correlation frequency, a slow moving frequency, and a fast moving frequency.

8. A non-transitory computer-readable storage medium containing computer instructions stored therein, which when executed by a computer system, cause the computer system to perform a method to estimate temperature at one or more points of the computer system, the method comprising:
storing a representation of a thermal model at the one or more points of the computer system in a memory, the thermal model using a filtering algorithm to filter temperature data from at least one temperature sensor at a plurality of frequencies to compensate for time-based under estimation and over estimation in the thermal model;
applying power to the computer system;
receiving temperature data from the at least one temperature sensor in response to the applied power; and
estimating an instantaneous temperature at the one or more points based on the temperature data using the thermal model, wherein the thermal model of the temperature at the one or more points is generated by merging a transient temperature portion of the thermal model with a steady state portion of the thermal model, wherein there are no temperature sensors located at the one or more points, and wherein the filtering algorithm filters temperatures received from the at least one temperature sensor which is not located at the one or more points.

9. A non-transitory computer-readable storage medium containing computer instructions stored therein, which when executed by a computer system, cause the computer system to perform a method to estimate temperature at one or more points of the computer system, the method comprising:
storing a representation of a thermal model at the one or more points of the computer system in a memory, the thermal model using a filtering algorithm to filter temperature data from at least one temperature sensor at a plurality of frequencies to compensate for time-based under estimation and over estimation in the thermal model;
applying power to the computer system;
receiving temperature data from the at least one temperature sensor in response to the applied power; and
estimating an instantaneous temperature at the one or more points based on the temperature data using the thermal model;
storing a representation of a future thermal model at the one or more points of the computer system in the memory; and
predicting a future temperature at the one or more points using the future thermal model.

10. The computer-readable storage medium of claim 9, further comprising initiating proactive measures to reduce temperature at the one or more points of the computer system based on the future thermal model, the proactive measures including one or more of the following:
thermal-throttling the computer system,
engaging cooling fans,
managing and redistributing power, and
switching from external graphics to internal graphics.

11. A data processing apparatus comprising:
at least one temperature sensor;
a memory to store a representation of a thermal model at one or more critical points of the data processing apparatus, the thermal model using a filtering algorithm to filter temperature data from at least one temperature sensor at a plurality of frequencies to compensate for time-based under estimation and over estimation in the thermal model, the thermal model having a steady state portion and a transient temperature portion estimated separately from each other; and
a controller coupled with the at least one temperature sensor and the memory, the controller to perform the following:
apply power to the data processing apparatus;
receive the temperature data from the at least one temperature sensor in response to the applied power; and estimate an instantaneous temperature at the one or more critical points based on the temperature data by combining the steady state portion and the transient temperature portion of the thermal model.

12. The data processing apparatus of claim 11, wherein the plurality of frequencies includes a set of three frequencies including a maximum correlation frequency, a slow moving frequency, and a fast moving frequency.

13. A data processing apparatus comprising:
at least one temperature sensor;
a memory to store a representation of a thermal model at one or more critical points of the data processing apparatus, the thermal model using a filtering algorithm to filter temperature data from at least one temperature sensor at a plurality of frequencies to compensate for time-based under estimation and over estimation in the thermal model; and
a controller coupled with the at least one temperature sensor and the memory, the controller to perform the following:
apply power to the data processing apparatus;
receive the temperature data from the at least one temperature sensor in response to the applied power; and
estimate an instantaneous temperature at the one or more critical points based on the temperature data using the thermal model, wherein the thermal model of the temperature at the one or more critical points is generated by merging a transient temperature portion of the thermal model with a steady state portion of the thermal model, wherein there are no temperature sensors located at the one or more critical points, and wherein the filtering algorithm filters temperatures received from the at least one temperature sensor which is not located at the one or more critical points.

14. A data processing apparatus comprising:
at least one temperature sensor;
a memory to store a representation of a thermal model at one or more critical points of the data processing apparatus, the thermal model using a filtering algorithm to filter temperature data from at least one temperature sensor at a plurality of frequencies to compensate for time-based under estimation and over estimation in the thermal model; and
a controller coupled with the at least one temperature sensor and the memory, the controller to perform the following:
apply power to the data processing apparatus;
receive temperature data from the at least one temperature sensor in response to the applied power; and
estimate an instantaneous temperature at the one or more critical points based on the temperature data using the thermal model, wherein the memory is further to store a representation of a future thermal model at the one or more critical points of the data processing apparatus in the memory.

15. The data processing apparatus of claim 14, wherein the controller is further to predict a future temperature at the one or more critical points using the future thermal model stored in the memory.

16. The data processing apparatus of claim 15, wherein the controller is further to initiate proactive measures to reduce temperature at the one or more critical points of the data processing apparatus based on the future temperature model, the proactive measures including one or more of the following:
thermal-throttling the data processing apparatus,
engaging cooling fans,
managing and redistributing power, and
switching from external graphics to internal graphics.

* * * * *